US012762134B2

(12) United States Patent
Bansal et al.

(10) Patent No.: US 12,762,134 B2
(45) Date of Patent: Oct. 13, 2026

(54) SELF-HEALING GENERATIVE AI/ML PIPELINE FOR GENERATING COMPLEX DATA QUERIES LEVERAGING SEMANTIC DATA MODEL

(71) Applicant: Goldman Sachs & Co. LLC, New York, NY (US)

(72) Inventors: Jaimita Bansal, Jersey City, NJ (US); Pierre De Belen, Hoboken, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 19/067,566

(22) Filed: Feb. 28, 2025

(65) Prior Publication Data

US 2026/0003879 A1 Jan. 1, 2026

Related U.S. Application Data

(60) Provisional application No. 63/665,979, filed on Jun. 28, 2024.

(51) Int. Cl.
*G06F 16/2458* (2019.01)

(52) U.S. Cl.
CPC ................................ *G06F 16/2471* (2019.01)

(58) Field of Classification Search
CPC ..................................................... G06F 16/247
See application file for complete search history.

(56) References Cited

U.S. PATENT DOCUMENTS

| | | | | |
|---|---|---|---|---|
| 8,938,644 | B2 * | 1/2015 | Clark | G06F 11/3466 707/718 |
| 11,561,979 | B2 * | 1/2023 | Li | G06F 16/248 |
| 11,971,985 | B2 * | 4/2024 | Xu | G06F 21/554 |
| 2012/0191745 | A1 * | 7/2012 | Velipasaoglu | G06F 16/3322 707/E17.074 |
| 2020/0380315 | A1 * | 12/2020 | Speiser | G06F 18/285 |
| 2024/0160856 | A1 * | 5/2024 | Sprott | G06N 7/01 |
| 2024/0330279 | A1 * | 10/2024 | Truong | G06F 16/2428 |
| 2024/0364814 | A1 * | 10/2024 | Mehta | H04L 51/046 |
| 2024/0386015 | A1 | 11/2024 | Crabtree et al. | |
| 2024/0394600 | A1 | 11/2024 | Cunningham et al. | |
| 2025/0217351 | A1 * | 7/2025 | Tan | G06F 16/2423 |

(Continued)

OTHER PUBLICATIONS

Non-Final Office Action dated Oct. 23, 2025 in connection with U.S. Appl. No. 19/316,841, 9 pages.

*Primary Examiner* — Etienne P Leroux

(57) ABSTRACT

A method includes providing a user query to an AI/ML pipeline. The user query requests a response based on data stored in a data topology, and the data topology is modeled using a semantic data model. The method also includes generating an initial data access query for retrieving the data from the data topology using the AI/ML pipeline and the semantic data model. The method further includes determining that the initial data access query includes a hallucination or error and performing an automatic loop one or more times. The automatic loop includes generating an updated data access query for retrieving the data; determining whether the updated data access query includes a hallucination or error; and, if so, repeating the automatic loop. In addition, the method includes using a final data access query with no hallucination or error to retrieve the data from the data topology in order to generate the response.

20 Claims, 6 Drawing Sheets

(56) References Cited

U.S. PATENT DOCUMENTS

| | | | | |
|---|---|---|---|---|
| 2025/0225008 | A1 | 7/2025 | Dotan-Cohen et al. | |
| 2025/0258819 | A1 * | 8/2025 | Jain | G06F 40/279 |
| 2025/0321944 | A1 * | 10/2025 | Townsend-Last | G06F 16/23 |
| 2025/0391550 | A1 * | 12/2025 | Chavarukattil | G16H 40/40 |
| 2026/0119476 | A1 * | 4/2026 | Xu | G06F 16/2365 |

* cited by examiner

SELF-HEALING GENERATIVE AI/ML PIPELINE FOR GENERATING COMPLEX DATA QUERIES LEVERAGING SEMANTIC DATA MODEL

CROSS-REFERENCE TO RELATED APPLICATION AND PRIORITY CLAIM

This application claims priority under 35 U.S.C. § 119 (e) to U.S. Provisional Patent Application No. 63/665,979 filed on Jun. 28, 2024, which is hereby incorporated by reference in its entirety.

TECHNICAL FIELD

This disclosure is generally directed to generative artificial intelligence/machine learning (AI/ML). More specifically, this disclosure is directed to a self-healing generative AI/ML pipeline for generating complex data queries leveraging a semantic data model.

BACKGROUND

Generative artificial intelligence/machine learning (AI/ML) models today can respond to users' queries from a large text corpus, such as by using a statistical similarity vector search with retrieval-augmented generation (RAG) or fine-tuning models. Problems with generative AI/ML models and these methods include (i) hallucinations in which an AI/ML model makes up an incorrect response and (ii) context length limitations in which an AI/ML model can only use a limited amount of contextual information. AI/ML models can also fail to satisfactorily generate responses for queries or cannot directly understand/process certain types of data, such as relational data (like big tabular data with columns having relationships and patterns) or other data topologies. Traditionally, SQL queries are created to fetch relational data, but SQL queries are often limited to responding to queries of users who know the physical schema of the data. Users who are unfamiliar with how relational data is stored are unable to create SQL queries in a simple manner, such as by using natural language.

SUMMARY

This disclosure relates to a self-healing generative artificial intelligence/machine learning (AI/ML) pipeline for generating complex data queries leveraging a semantic data model.

In a first embodiment, a method includes providing a user query to a self-healing multi-agent AI/ML pipeline. The user query requests a response based on data stored in a data topology, and the data topology is modeled using a semantic data model. The method also includes generating an initial data access query for retrieving the data from the data topology using the AI/ML pipeline and the semantic data model. The method further includes determining that the initial data access query includes a hallucination or error and performing an automatic loop one or more times. The automatic loop includes generating an updated data access query for retrieving the data from the data topology using the AI/ML pipeline and the semantic data model; determining whether the updated data access query includes a hallucination or error; and, if the updated data access query includes a hallucination or error, repeating the automatic loop. In addition, the method includes using a final data access query with no hallucination or error to retrieve the data from the data topology in order to generate the response.

In a second embodiment, an apparatus includes at least one processing device configured to provide a user query to a self-healing multi-agent AI/ML pipeline. The user query requests a response based on data stored in a data topology, and the data topology is modeled using a semantic data model. The at least one processing device is also configured to generate an initial data access query for retrieving the data from the data topology using the AI/ML pipeline and the semantic data model. The at least one processing device is further configured to determine that the initial data access query includes a hallucination or error and perform an automatic loop one or more times. To perform the automatic loop, the at least one processing device is configured to generate an updated data access query for retrieving the data from the data topology using the AI/ML pipeline and the semantic data model; determine whether the updated data access query includes a hallucination or error; and, if the updated data access query includes a hallucination or error, repeat the automatic loop. In addition, the at least one processing device is configured to use a final data access query with no hallucination or error to retrieve the data from the data topology in order to generate the response.

In a third embodiment, a non-transitory computer readable medium contains instructions that when executed cause at least one processor to provide a user query to a self-healing multi-agent AI/ML pipeline. The user query requests a response based on data stored in a data topology, and the data topology is modeled using a semantic data model. The non-transitory computer readable medium also contains instructions that when executed cause the at least one processor to generate an initial data access query for retrieving the data from the data topology using the AI/ML pipeline and the semantic data model. The non-transitory computer readable medium further contains instructions that when executed cause the at least one processor to determine that the initial data access query includes a hallucination or error and perform an automatic loop one or more times. The instructions when executed cause the at least one processor, during the automatic loop, to generate an updated data access query for retrieving the data from the data topology using the AI/ML pipeline and the semantic data model; determine whether the updated data access query includes a hallucination or error; and, if the updated data access query includes a hallucination or error, repeat the automatic loop. In addition, the non-transitory computer readable medium contains instructions that when executed cause the at least one processor to use a final data access query with no hallucination or error to retrieve the data from the data topology in order to generate the response.

Any one or any combination of the following features may be used with the first, second, or third embodiment.

The semantic data model may represent the data topology and identify dataspaces, classes, and properties associated with the data topology. Agents of the AI/ML pipeline may be configured to use the semantic data model to identify a specific dataspace, one or more specific classes, and one or more specific properties associated with the user query. Each data access query may be generated based on the specific dataspace, the one or more specific classes, and the one or more specific properties.

The semantic data model may provide context to the agents of the AI/ML pipeline. The agents may include one or more AI/ML models configured to generate responses when prompted by the agents. The responses from the one or more AI/ML models may identify the specific dataspace, the one or more specific classes, the one or more specific properties, and the data access queries.

The data topology may include tabular data, and the semantic data model may allow the AI/ML pipeline to understand columns of data in the tabular data.

The semantic data model may model the data topology using multiple classes and associated properties that are semantically aligned with natural language on which the AI/ML pipeline is trained. At least some of the classes may be associated with multiple associations in the semantic data model.

The AI/ML pipeline may include a dataspace agent, a class agent, a property agent, a query agent, and a self-healing agent. The dataspace agent may be configured to identify one of multiple dataspaces associated with the user query. The class agent may be configured to identify at least one of multiple classes associated with the selected dataspace, and the at least one selected class may be mapped to the data topology. The property agent may be configured to identify at least one of multiple properties within the at least one selected class. The query agent may be configured to generate each data access query based on at least one of: the at least one selected class and the at least one selected property. The self-healing agent may be configured to determine, for each data access query, whether a syntax of the data access query has one or more errors; at least one property in the data access query exists; one or more values in the data access query are proper; and a data type of a value in the data access query matches an expected data type.

At least one of the data access queries may be based on one or more of: filtering of at least one of classes and properties defined in the semantic data model based on the user query; and joining of at least one of classes and properties defined at multiple levels in the semantic data model based on the user query.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
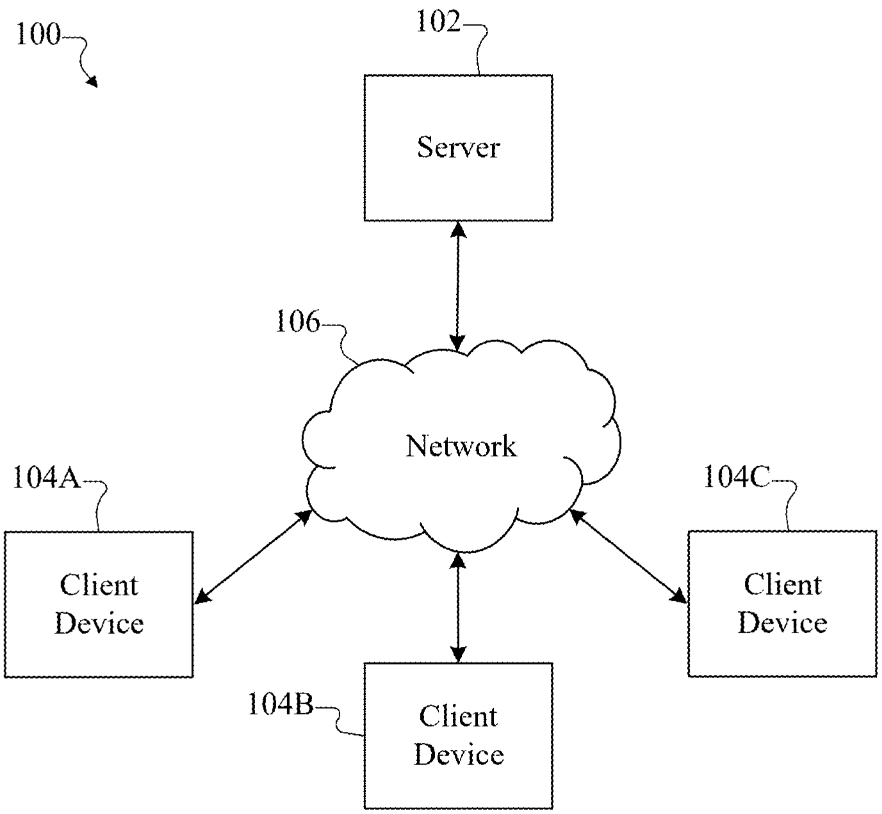
FIG. 1 illustrates an example networked computing environment suitable for use with a self-healing generative artificial intelligence/machine learning (AI/ML) pipeline in accordance with one embodiment of this disclosure.

FIGS. 1 through 9, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system. The figures and the following description describe certain embodiments by way of illustration only, and one skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

As noted above, generative artificial intelligence/machine learning (AI/ML) models today can respond to users' queries from a large text corpus, such as by using a statistical similarity vector search with retrieval-augmented generation (RAG) or fine-tuning models. Problems with generative AI/ML models and these methods include (i) hallucinations in which an AI/ML model makes up an incorrect response and (ii) context length limitations in which an AI/ML model can only use a limited amount of contextual information. AI/ML models can also fail to satisfactorily generate responses for queries or cannot directly understand/process certain types of data, such as relational data (like big tabular data with columns having relationships and patterns) or other data topologies. Traditionally, SQL queries are created to fetch relational data, but SQL queries are often limited to responding to queries of users who know the physical schema of the data. Users who are unfamiliar with how relational data is stored are unable to create SQL queries in a simple manner, such as by using natural language.

This disclosure provides various techniques supporting a self-healing generative AI/ML pipeline for generating complex data queries leveraging a semantic data model. As described in more detail below, a user query may be provided to or obtained by a self-healing multi-agent AI/ML pipeline. The user query can request a response based on data stored in a data topology, and the data topology can be modeled using a semantic data model. An initial data access query for retrieving the data from the data topology can be generated using the AI/ML pipeline and the semantic data model. It can be determined that the initial data access query includes a hallucination or error, and an automatic loop can be performed one or more times. During the automatic loop, an updated data access query for retrieving the data from the data topology can be generated using the AI/ML pipeline and the semantic data model, a determination can be made whether the updated data access query includes a hallucination or error, and, if so, the automatic loop can be repeated. A final data access query with no hallucination or error can be used to retrieve the data from the data topology in order to generate the response.

In this way, these techniques can be used to provide a systematic framework having a self-healing generative AI/ML pipeline, which can operate in conjunction with at least one semantic data model. The framework can be used to generate responses to user queries (including complex user queries) in natural languages like English based on relational data or other data topologies that might ordinarily require specialized knowledge of the data topologies. In some cases, users can interact with the self-healing generative AI/ML pipeline via a natural language chat assistant or other interface to facilitate easier usage of the generative AI/ML pipeline. The framework here can be model-driven so that data is described and connected in a consistent and programmatic way. For example, among other things, data can be modeled to create graphs or other logical representations of the data capturing how various concepts connect and relate to each other. As a result, data consumers are able to much more easily search for widely-understood concepts or other concepts and locate high-quality data that can be trusted.

FIG. 1 illustrates an example networked computing environment 100 suitable for use with a self-healing generative AI/ML pipeline in accordance with one embodiment of this disclosure. As shown in FIG. 1, the networked computing environment 100 includes a server 102 and a set of client devices 104A-104C connected via a network 106. The server 102 includes one or more computing devices that can provide a self-healing generative AI/ML pipeline to client devices 104A-104C. In some embodiments, the server 102 provides a generative AI/ML pipeline that uses self-healing based on a semantic data model. As described below, the self-healing can compensate for hallucinations, provide context, and/or solve other problems that may otherwise limit the usefulness of the generative AI/ML pipeline.

The client devices 104A-104C include computing devices with which users can interact with the generative AI/ML pipeline. For example, a client device 104A-104C may be a desktop computer, laptop computer, tablet computer, smartphone, or any other suitable computing device. In the embodiment shown here, the networked computing environment 100 includes three client devices 104A-104C, but any number of client devices may be included.

The network 106 provides communication channels via which the other elements of the networked computing environment 100 communicate. The network 106 can include any combination of local area and wide area networks using wired or wireless communication systems. In some embodiments, the network 106 uses standard communications technologies and protocols. For example, the network 106 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 106 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 106 may be represented using any suitable format, such as hypertext markup language (HTML) or extensible markup language (XML). In some embodiments, some or all of the communication links of the network 106 may be encrypted using any suitable technique or techniques.

As described in more detail below, the networked computing environment 100 can support a generative AI/ML and data modeling platform, such as a platform implemented using the server 102. In some embodiments, the platform represents an open-sourced generative AI/ML and data modeling platform, such as one implemented using the LEGEND data management platform. This or other types of platforms may be used to (among other things) allow external parties to combine data modeling concepts with an open-sourced generative AI/ML pipeline. In whatever manner implemented, the platform can be used to create an easy-to-use and trustworthy user experience for curating and querying relational data or other data topologies with reduced risk of hallucinations. For example, through natural language statements, users (such as users of the client devices 104A-104C) can create semantic data models and/or generate data access queries using the semantic data models for execution to obtain higher-quality data outputs (often within minutes).

In some embodiments, users may be able to perform a variety of functions related to the platform. For example, the users may be able to provide queries directly to a generative AI/ML model without using a semantic data model and see how responses suffer from hallucinations. The users may be able to create queries using a generative AI/ML pipeline and obtain higher-quality outputs while limiting the risk of hallucinations. The users may be able to obtain self-healing queries generated using generative AI/ML based on prescriptions implemented in response to compile and build errors or other issues. The users may be able to develop best practices related to prompt engineering and the limits of context length. The users may be able to use small and big generative AI/ML models to understand the balance between inference times, costs of hosting, and quality of generation.

The generative AI/ML pipeline (described in more detail below) can support a number of functions on behalf of users. Among other things, the generative AI/ML pipeline can be used by the users to perform one, some, or all of the following functions. The users can use a sample data model to learn data modeling concepts connected in a graph-like fashion, complete with technical constraints and data structures. The users can build data models faster and search the data models more easily and reliably using combined generative AI/ML and data modeling. The users can learn ways to overcome hallucinations in generative AI/ML for specific data searches in order to obtain higher-quality outputs. The users can obtain self-healing data queries using a generative AI/ML pipeline. The users can learn better prompts for generative AI/ML and data searches in specific industries or other use cases. The users can learn and explore the limits of prompt engineering in generative AI/ML. The users can learn about context length limits in generative AI/ML and how to overcome them. The users can learn considerations while picking from prompt engineering versus fine tuning approaches. The users can learn considerations while picking from smaller models with fewer hyperparameters versus larger models in open source. The users can understand the balance between costs of hosting, inference times, and quality of generation and pick according to their needs. Overall, using the generative AI/ML pipeline, users can create data access queries in real-time, such as by using natural language statements, on top of a semantic data model. The data access queries can be executed to obtain higher-quality responses.

The disclosed techniques may provide various advantages or benefits depending on the implementation. In some cases, the disclosed techniques may provide value in any data discovery or search application using generative AI/ML that struggles with controlling hallucinations, streamlining responses to specific workflows, or building trust in data output from the generative AI/ML techniques. Example use cases may use a cloud deployment of the platform that starts with an initial version of a data model, sample data, and queries that can be improved upon using the disclosed techniques. For instance, one example data set may include global carbon dioxide ($CO_2$) emissions, and users may provide queries such as "show me the top 10 countries with emissions for 2021."

The following discussion provides additional details regarding the self-healing generative AI/ML pipeline and examples of how the generative AI/ML pipeline may be used. Note that these details and use cases are examples only, and other implementations and uses of the generative AI/ML pipeline are possible and within the scope of this disclosure. Any feature or component that is described as important, critical, or otherwise required should only be considered required in that particular embodiment. Other embodiments may include variations of that feature or component or omit it entirely.

Although FIG. 1 illustrates one example of a networked computing environment 100 suitable for use with a self-healing generative AI/ML pipeline, various changes may be made to FIG. 1. For example, the networked computing environment 100 may include any suitable number of each illustrated component. Also, the networked computing environment 100 may include different or additional elements in other embodiments. In addition, the functions described with respect to the networked computing environment 100 may be distributed among the elements in a different manner than described. For instance, although a client-server architecture is described here, in some embodiments, the disclosed functionality may be provided locally by a single computing device, potentially without access to the network 106.

Figure 2:
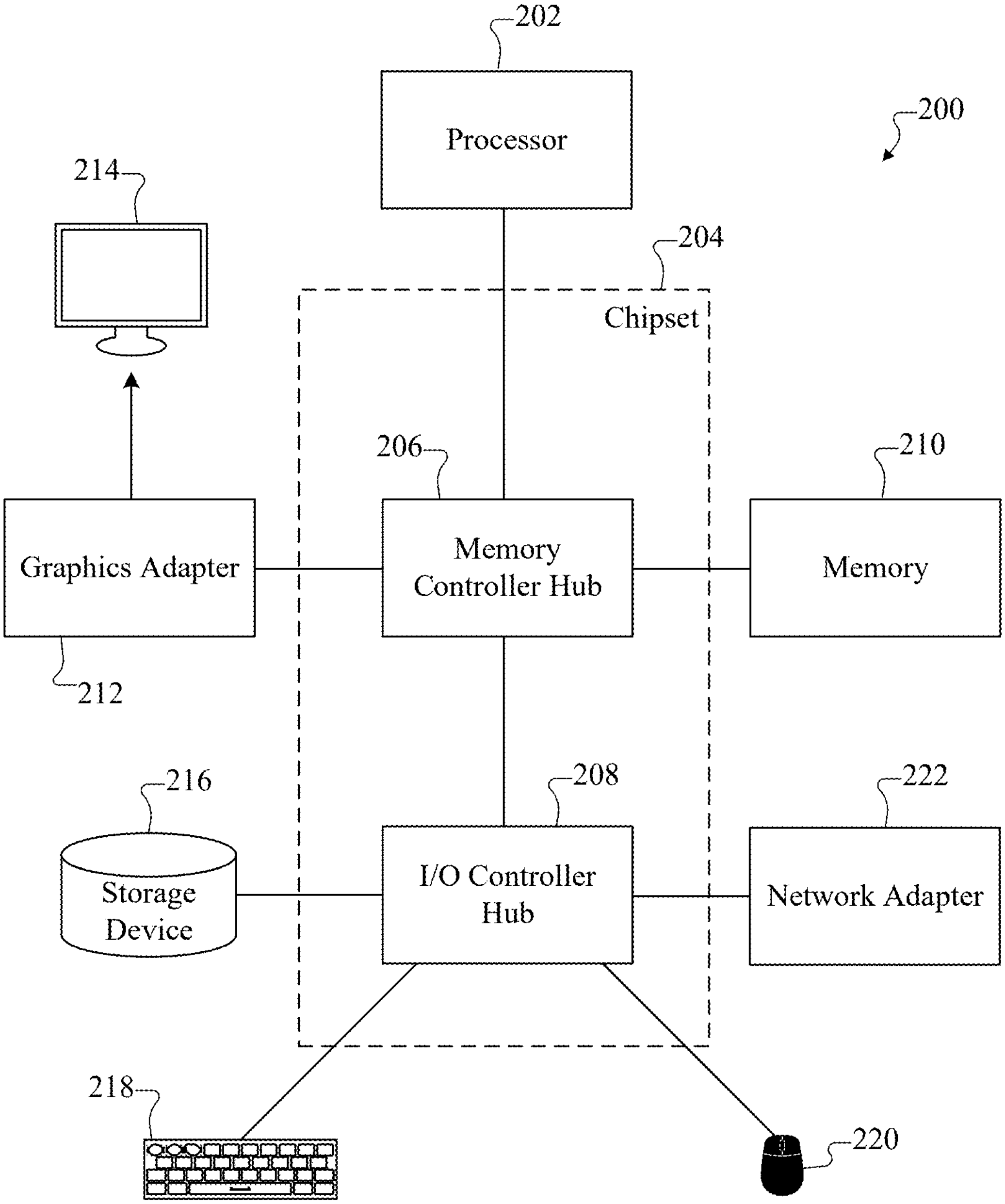
FIG. 2 illustrates an example computer system suitable for use in the networked computing environment of FIG. 1 in accordance with one embodiment of this disclosure.

FIG. 2 illustrates an example computer system 200 suitable for use in the networked computing environment 100 of FIG. 1 in accordance with one embodiment of this disclosure. In some embodiments, for example, the computer system 200 may be used to implement the server 102 or any of the client devices 104A-104C. However, each of these components may be implemented in any other suitable manner.

As shown in FIG. 2, the example computer system 200 includes at least one processor 202 coupled to a chipset 204. In this example, the chipset 204 includes a memory controller hub 206 and an input/output (I/O) controller hub 208. A memory 210 and a graphics adapter 212 are coupled to the memory controller hub 206, and a display 214 is coupled to the graphics adapter 212. A storage device 216, keyboard 218, pointing device 220, and network adapter 222 are coupled to the I/O controller hub 208.

In some embodiments, the storage device 216 may include a non-transitory computer-readable storage medium, such as a hard drive, compact disc read-only memory (CD-ROM), digital versatile disc (DVD), or solid-state memory device. The memory 210 may hold instructions and data used by the processor 202. The pointing device 220 may represent a mouse, track ball, touch-screen, track pad, or other type of pointing device, and the pointing device 220 may be used in combination with the keyboard 218 (which in some cases may be an on-screen keyboard) to input data into the computer system 200. The graphics adapter 212 may display images and other information on the display 214. The network adapter 222 may couple the computer system 200 to one or more computer networks, such as the network 106.

Note that the types of computer systems used by the components of FIG. 1 can vary depending upon the embodiment and the processing power required or desired by the component. For example, the server 102 might include multiple blade servers working together to provide the functionality described. Furthermore, some embodiments of the computer system 200 may lack some of the components shown in FIG. 2, such as when a keyboard 218, graphics adapter 212, and/or display 214 is omitted.

Although FIG. 2 illustrates one example of a computer system 200 suitable for use in the networked computing environment 100 of FIG. 1, various changes may be made to FIG. 2. For example, computing and communication devices and systems come in a wide variety of configurations, and FIG. 2 does not limit this disclosure to any particular computing or communication device or system. Other embodiments of the computer system 200 can have different architectures than the one shown here.

The following describes example approaches in which a self-healing AI/ML pipeline containing different AI/ML agents can receive user queries, where responses to the user queries can be generated based on data retrieved from relational data or other data topologies. The AI/ML pipeline can use generative AI/ML (such as one or more large language models) in order to generate data access queries. Those data access queries are based on the user queries and (if executed) can be used to try and retrieve the data needed to respond to the user queries. The AI/ML pipeline uses one or more semantic data models during the process of generating the data access queries, where the one or more semantic data models provide metadata regarding the data to be queried. The AI/ML pipeline or other components can determine when the data access queries are or might be incorrect, such as when the data access queries contain syntax errors, other errors, or hallucinations. When such issues are detected, the AI/ML pipeline can use a self-healing agent, possibly in an iterative process, to construct valid data access queries. Once valid data access queries are obtained, the valid data access queries can be executed in order to retrieve the desired data from the data topology or data topologies, and responses to the user queries can include or be based on the retrieved data.

As described above, AI/ML models can fail to satisfactorily respond to user queries or be trained directly on or be able to directly understand certain types of data, such as relational data (like big tabular data with columns having relationships and patterns) or other data topologies. As an example, consider the following relational table.

| Date | ID | Value |
|---|---|---|
| 2025 Jan. 12 | 1 | 230 |
| 2016 Jan. 12 | 2 | 240 |

It can be seen in this table that there are data fields for a date, an identifier (ID), and a value. However, it is hard for both humans and AI/ML models (such as large language models) to understand what these columns truly represent. While the meanings of fields like dates may be self-explanatory and the meanings of fields like identifiers may be inferred, it is unclear here what some values represent and what the significance of each value is. Unless a data producer describes the above data more specifically, it may be difficult or impossible for an AI/ML model to know what the data in the above table represents. For instance, an AI/ML model may have no way of determining that the above table represents bond data, where a maturity date, a bond identifier, and a price are provided for each bond.

In some cases, the relational table above may be modeled in a semantic data model, such as by using the following notation:

Class Bond {maturityDate: StrictDate[1], bondID: Integer [1], price: Float[1]}

As can be seen in the simplified example here, once data is modeled in the above manner or another manner using classes and their properties, there is additional information available that can be mapped to the columns of the relational table. As described below, semantic data models can therefore be defined and used by AI/ML pipelines to obtain understanding of the data stored in relational tables or other data organizations. The semantic data models allow the AI/ML pipelines to correctly generate data access queries that can be used to accurately respond to user queries or perform other functions. For instance, using the relational table above, an AI/ML pipeline may be able to receive a user query like "Which bonds have a price more than $200 USD?", which would have been difficult if not impossible to answer with only the relational table. Because a semantic data model can provide an AI/ML pipeline with semantic context to map user queries to the correct columns, the AI/ML pipeline can generate suitable data access queries that can be used to retrieve data for responding to the user queries much more effectively.

Note that classes and properties are one example of the types of information that can be associated with relational tables or other data. Other or additional types of information can be associated with relational tables or other data using a semantic data model. For example, data producers may generate brief descriptions or detailed documentation associated with each class of data, and the brief descriptions or detailed documentation may be included in or identified by a semantic data model. The brief descriptions or detailed documentation may subsequently be accessed by or provided to an AI/ML pipeline, and the AI/ML pipeline may use the brief descriptions or detailed documentation as context for determining how data access queries should be generated in order to respond to user queries. This allows the brief descriptions or detailed documentation to increase the accuracy of generated responses to the user queries and reduce or prevent hallucinations by the AI/ML pipeline.

As another example, associations between classes of one or more depths can be defined in a semantic data model. As an example, consider that bond data often has associated borrower data. As a particular example, a relational table may be defined as follows.

| Name | Place | ID | Value |
|---|---|---|---|
| Pierre | NJ | 1 | 1410 |
| Jimy | NJ | 1 | 200 |
| Neema | NY | 2 | 4000 |

In this case, the bond data may be represented by the semantic data model as follows.

```
Class Borrower {name: String[1], place: String[1], bondID: Integer[1], value: Float[1]}
  Association BorrowerBonds {borrower: Borrower[1], bond: Bond[*]}
```

Figure 3:
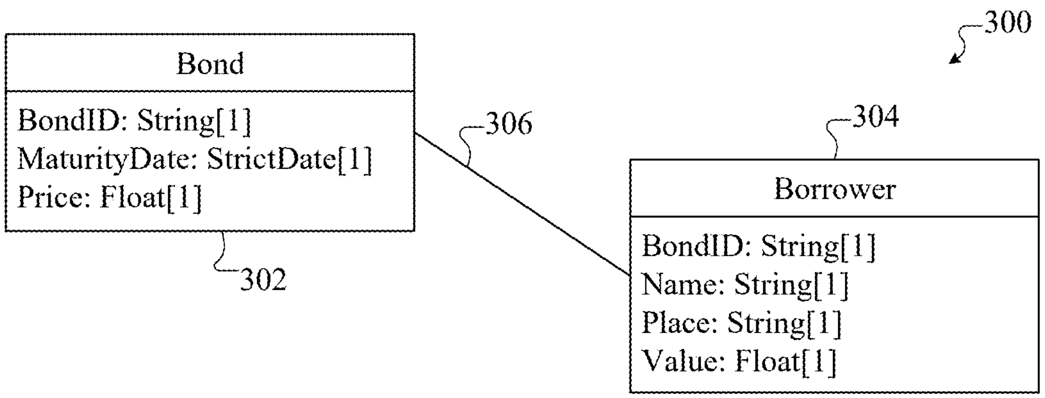
FIG. 3 illustrates an example association involving relational data in accordance with one embodiment of this disclosure.

In some cases, associations can be illustrated graphically. FIG. 3 illustrates an example association 300 involving relational data in accordance with one embodiment of this disclosure. In this example, there is a class 302 with its associated properties and another class 304 with its associated properties. A line 306 linking the two classes 302, 304 can be said to represent an association of the two classes 302, 304. Note that the example shown in FIG. 3 is for illustration only and that other associations (possibly one-to-many, many-to-one, or many-to-many associations) may be supported in any given implementation.

Again, a semantic data model can be used to model associations between classes as well as the properties of those classes. This allows an AI/ML pipeline to gain understanding of the associations between the classes, which again can be useful for generating data access queries used to respond to user queries or performing other functions. In some embodiments, given a semantic data model representing classes and their associations, an AI/ML pipeline may perform one or more filtering operations and/or one or more join operations using the semantic data model. In some cases, each filtering operation may be used to filter the classes and/or properties based on a user query, such as to identify the class or classes and/or the property or properties that are relevant to the user query. Also, in some cases, each join operation may be used to join or combine classes and/or properties from multiple depths of classes defined by the semantic data model, where the joined classes and/or properties are relevant to the user query. Both the filtering operations and the join operations can be achieved based on the semantic context provided by the semantic data model. This is different and much more effective than simply using general SQL queries directly on relational tables. Moreover, this approach allows the syntax of the semantic data model to be universally transpiled into any suitable database queries or other data access queries, such as SQL queries or Snowflake queries.

As a particular example of this, assume that the LEGEND data management platform is being used. Also assume that a user query requests retrieval of all bond identifiers and their borrower names where the price of the bond exceeds $200 USD. Using the classes and associations defined above, an AI/ML pipeline may be used to construct the following data access query in order to retrieve the requested data.

```
query: |Bond.all( )->filter (b | $b.price > 200)->project(
  [
    b | $b.bondId, b | $b.price, b| $b.borrower.name
  ],
  [
    'Bond ID', 'Bond Price', 'Borrower'
  ])
```

Data access queries can vary widely based on a number of factors, such as the database technology being used, the specific data being requested, and the formatting of the data in the database. As a result, when an AI/ML pipeline generates a data access query, the data access query may or may not be correct. As described below, the AI/ML pipeline can include or be used in conjunction with a compiler or other logic that checks the syntax or other aspects of each data access query to determine whether the data access query generated by the AI/ML pipeline is valid. For example, the compiler or other logic may check whether each data access query has syntax errors, whether the property or properties selected for inclusion in each data access query actually exist, and/or whether one or more enumerated values or other values generated for inclusion in each data access query actually exist or are otherwise proper. As other examples, the compiler or other logic may also or alternatively check whether each value to be compared in a filter statement, including a value in a user query, matches an expected or correct data type and/or whether any constraints specified in the semantic data model are followed.

This approach can also be used to help reduce or eliminate hallucinations in generated data access queries. For example, compilation errors for data access queries and build errors from a query engine can be identified, and one or more prescription plans can be implemented to provide guidance on how to overcome the errors. In some cases, this may provide a form of self-healing in which errors and their associated prescription plans can be used as additional context. For instance, the AI/ML pipeline can be used in a "multi-turn" conversational manner in which prompts are generated and provided to one or more AI/ML models in an iterative manner until a suitable data access query is obtained. This form of self-healing also helps when checking for hallucinations from the AI/ML pipeline and increases the accuracy of the syntax produced by the AI/ML pipeline.

The following now describes example frameworks and other architectures in which these functionalities may be implemented. Note that these frameworks and other architectures are for illustration and explanation only and that other architectures may be used. For instance, other architectures that are not based on the LEGEND data management platform may be used here.

Figure 4:
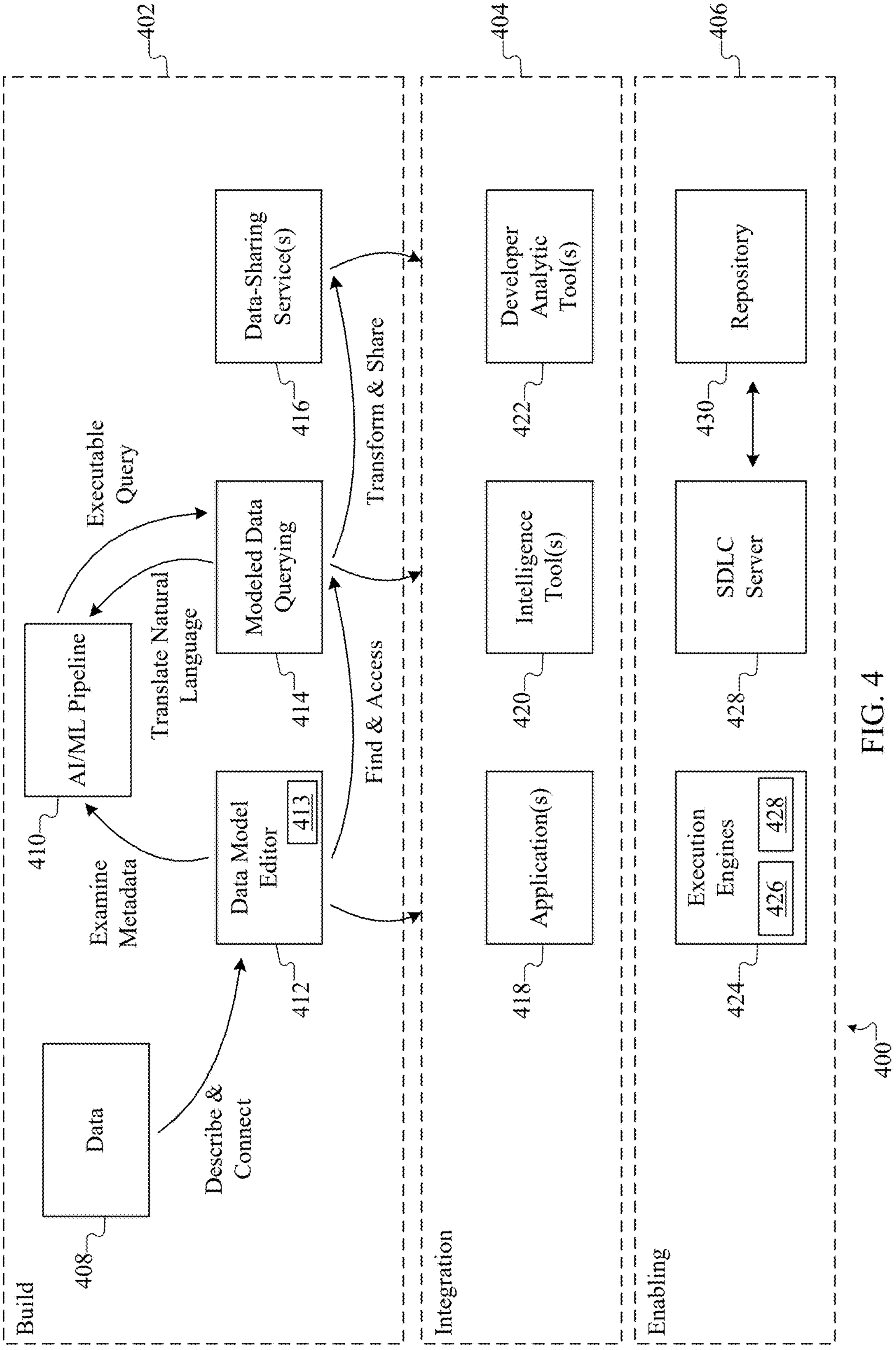
FIG. 4 illustrates an example AI/ML framework supporting a self-healing generative AI/ML pipeline in accordance with one embodiment of this disclosure.

FIG. 4 illustrates an example AI/ML framework 400 supporting a self-healing generative AI/ML pipeline in accordance with one embodiment of this disclosure. For case of explanation, the AI/ML framework 400 is described as being implemented using the server 102 in the networked computing environment 100 shown in FIG. 1, where the server 102 can be implemented using one or more instances of the computer system 200 shown in FIG. 2. However, the AI/ML framework 400 may be implemented using any other suitable device(s) and in any other suitable system(s).

As shown in FIG. 4, the AI/ML framework 400 is divided into multiple logical layers 402, 404, 406 that provide different functionalities. In this example, the logical layer 402 supports "build" functionality, which allows users to model data and generate semantic data models and to query data using the semantic data models. The logical layer 402 here includes or has access to data 408 and includes a generative multi-agent AI/ML pipeline 410. The data 408 represents data in any suitable data source(s) to be accessed using data access queries. While the data 408 is shown as forming a part of the logical layer 402, the data 408 may actually reside at any suitable location(s), such as within the server 102 implementing the AI/ML framework 400 or external to (but accessible by) the server 102.

Figure 5:
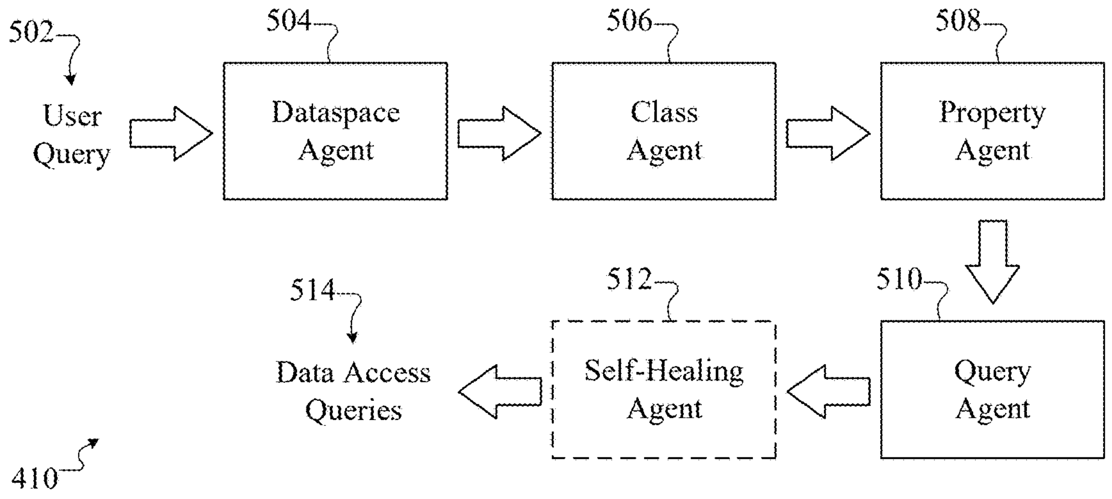
FIG. 5 illustrates an example generative AI/ML pipeline supporting self-healing in accordance with one embodiment of this disclosure.

The AI/ML pipeline 410 represents a multi-agent AI/ML-based pipeline that can generate data access queries for retrieving at least some of the data 408 for use in generating responses to user queries. For example, the AI/ML pipeline 410 can include multiple agents that identify different aspects of information needed to generate a data access query based on a user query. As particular examples, the AI/ML pipeline 410 can include multiple agents that identify dataspaces, classes, and properties associated with user queries and an agent that generates data access queries based on the identified dataspaces, classes, and properties. The AI/ML pipeline 410 also includes a self-healing agent that can assist when generated data access queries are invalid or otherwise not usable in obtaining needed or requested data. One example implementation of the AI/ML pipeline 410 is shown in FIG. 5, which is described below.

The logical layer 402 here also includes a data model editor 412, a modeled data querying function 414, and at least one data-sharing service 416. The data model editor 412 generally allows users to describe their data 408, which may lead to the creation of metadata (including one or more semantic data models 413) that can be used as described below. For example, the data model editor 412 may allow users to create dataspaces and graphically define the classes, properties, and optional associations of their data 408 within the dataspaces. As a result, users can create graphs or other visual diagrams or representations of their data 408. The users can also connect (link) the defined classes and properties with their data 408, which helps to provide context for the data 408 during the generation of data access queries by the AI/ML pipeline 410. Note that the data 408 here may be stored in any suitable data topology and that the data model editor 412 can be used to create a semantic data model 413 that models the data topology. The data model editor 412 represents any suitable logic for modeling data, such as the LEGEND STUDIO data modeling editor.

The modeled data querying function 414 generally supports interactions with various components to execute data access queries, including those generated by the AI/ML pipeline 410, in order to retrieve data 408. The data access queries may be used to access and retrieve desired data 408, where the data 408 is modeled using the data model editor 412. Effectively, the modeled data querying function 414 can interact with the AI/ML pipeline 410 in order to convert one or more semantic data models 413 into actual usable data access queries. The modeled data querying function 414 represents any suitable logic for executing data access queries, such as the LEGEND QUERY product.

The at least one data-sharing service 416 represents one or more services that allow sharing of retrieved data 408, possibly after one or more transformations are applied to the retrieved data 408. For example, the at least one data-sharing service 416 may allow data access queries obtained by the modeled data querying function 414 to be converted into application programming interface (API) functions. When the API functions or other data-sharing functions are invoked, the data 408 can be queried via the data-sharing functions, which facilitates data exchange reliably and programmatically with other applications. The at least one data-sharing service 416 represents any suitable logic for sharing queried data, such as the LEGEND SERVICES product.

In this example, the logical layer 404 supports "integration" functionality, which allows users to implement additional logic that uses the modeled and queried data 408. For example, one or more applications 418 can be installed and used to process data 408 that is retrieved via the data-sharing service(s) 416. The application(s) 418 can provide any desired functionality based on the specific use case of the AI/ML framework 400. One or more intelligence tools 420 can be installed and used to process data 408 that is retrieved, such as to gain insights into the data 408. One or more developer analytic tools 422 can be installed and used to process data 408 that is retrieved in response to specific queries, such as to determine whether the queries are designed correctly in order to retrieve correct data 408. Note that these integration layer components are examples only and that retrieved data may be used by any suitable components and in any suitable manner.

In this example, the logical layer 406 supports "enabling" functionality, referring to functionality that helps implement or enable other functions of the AI/ML framework 400. For example, the logical layer 406 can include one or more execution engines 424, which can represent one or more servers 102 or other devices that execute the functions of the other layers 402, 404 or that execute functions to support the other layers 402, 404. Among other things, the one or more execution engines 424 can enable the use of the AI/ML framework 400 in a wide variety of data-driven workflows. In some embodiments, the at least one execution engine 424 can include at least one compiler 426 and at least one query engine 428. In some cases, each compiler 426 can be used to compile data access queries or other queries, such as to verify whether the data access queries have syntax errors or other issues. Also, in some cases, each query engine 428 can take data access queries (or compiled versions thereof) and retrieve data 408 based on the data access queries. Additional details regarding the compiler(s) 426 and query engine(s) 428 are provided below. The logical layer 406 can also include a software development lifecycle (SDLC) server 430, which can be used to support change management and other software development functions over time related to the AI/ML framework 400. Among other things, this can help to ensure safe collaboration regarding the AI/ML framework 400 and ensure stability of the AI/ML framework 400. The SDLC server 430 can communicate with a repository 432 (such as a GITLAB repository), which can be used to store different versions of software associated with the platform.

As described in more detail below, the AI/ML pipeline 410 supports the use of a self-healing AI/ML agent to assist in the generation of complex data queries. For example, the AI/ML pipeline 410 may use a semantic data model 413 produced by the data model editor 412 to generate data access queries in response to user queries (such as user queries in natural language), where each user query may request a response based on desired or specified data 408. For each user query, the AI/ML pipeline 410 may generate an initial data access query based on that user query. However, as data access queries can vary widely, the initial data access query may or may not be correct. For instance, the initial data access query may have one or more syntax errors or other error(s), or the AI/ML pipeline 410 may have suffered from a hallucination and created the initial data access query incorrectly (such as with a nonexistent class, property, or association).

If it is determined that the initial data access query includes a hallucination or error (such as via a compiler 426), a self-healing AI/ML agent of the AI/ML pipeline 410 can be used to generate an updated data access query, such as by using a prescription plan based on the hallucination or error. The prescription plan may provide additional information that can help the AI/ML pipeline 410 avoid the same type of hallucination or error. A determination can be made whether the updated data access query includes a hallucination or error. This can be repeated any number of times until a final data access query having no hallucination or error is generated by the AI/ML pipeline 410. The final data access query can be provided by the modeled data querying function 414 to a query engine 428 for execution in order to retrieve the desired or specified data 408, and that data 408 may be provided as or used to produce a response to the user query.

Note that a typical installation of an AI/ML framework 400 may involve one or more large semantic data models 413 identifying numerous classes associated with each other and numerous properties for each particular data domain, optionally along with numerous associations between various classes. As a result, some AI/ML models may be unable to receive or use the semantic data model(s) 413 directly, such as when the AI/ML models are restricted to a small window or amount of context. In some embodiments, the AI/ML pipeline 410 may perform functions like breadth first traversal (BFT) and/or depth first traversal (DFT) to identify appropriate classes, properties, and/or associations. Retrieval-augmented generation (RAG) involving one or more semantic data models 413 might also or alternatively be used to overcome context length limitations of the AI/ML pipeline 410.

The actual responses to the user queries that are generated based on data 408 retrieved using the AI/ML framework 400 may be used in any suitable manner. For example, the one or more applications 418 in the AI/ML framework 400 may support a wide variety of functions related to the responses to user queries. In some cases, for example, the responses to the user queries may be displayed to the users who submitted the user queries, such as when the responses are displayed on desktop/laptop/tablet computers, smartphones, or other end-user devices. However, more complex functionality may also be supported by the one or more applications 418. For instance, the one or more applications 418 may support "chat" functionality in which user queries are submitted by users via one or more chatbots, which can provide the responses to the user queries in chat form. Responses can also be provided by the one or more applications 418 in other formats, such as when data 408 retrieved in response to a user query is provided in comma-separated value (CVS) format or MICROSOFT EXCEL format, plotted in a graph or other illustration, or provided as a TABLEAU or other data extract.

Although FIG. 4 illustrates one example of an AI/ML framework 400 supporting a self-healing generative AI/ML pipeline, various changes may be made to FIG. 4. For example, while this particular embodiment of the AI/ML framework 400 may be based on the use of the LEGEND data management platform, this is not required, and other data management platforms or other platforms may be used here.

FIG. 5 illustrates an example generative AI/ML pipeline 410 supporting self-healing in accordance with one embodiment of this disclosure. For case of explanation, the generative AI/ML pipeline 410 is described as being used in the AI/ML framework 400 shown in FIG. 4. However, the generative AI/ML pipeline 410 may be used in any other suitable framework. Also, it is assumed in the following discussion that the generative AI/ML pipeline 410 is used to generate data access queries based on interactions with users who are using a natural language chat assistant. However, the generative AI/ML pipeline 410 may generate data access queries based on any other suitable interactions with users.

As shown in FIG. 5, the AI/ML pipeline 410 receives a user query 502, which represents a query for which the AI/ML pipeline 410 can generate one or more data access queries in order to obtain data 408 useful in generating a response. The user query 502 may represent any suitable query from a user, such as a natural language query. The user query 502 may also be obtained in any suitable manner, such as when a user provides the user query 502 via speaking or typing.

The AI/ML pipeline 410 here represents a multi-agent pipeline in which different agents can perform different functions in order to facilitate generation of data access queries. In this example, the AI/ML pipeline 410 includes a dataspace agent 504, a class agent 506, a property agent 508, a query agent 510, and a self-healing agent 512. The generative AI/ML pipeline 410 is used to generate one or more data access queries 514, which can be provided to the modeled data querying function 414, query engine 428, or other component(s). Ideally, the one or more data access queries 514 can be executed in order to retrieve the data 408 requested by the user query 502. As can be seen here, the generative AI/ML pipeline 410 represents a multi-agent system in which multiple AI/ML-based agents take on different personas and interact with each other to output at least one proper executable data access query 514 based on the user query 502.

The dataspace agent 504 generally operates to select one of multiple dataspaces based on the user query 502. A dataspace generally represents a logical grouping of concepts of interest to an organization. The dataspaces that are supported by the dataspace agent 504 will therefore vary based on the specific organization for which the generative AI/ML pipeline 410 is being used. For example, for a finance-related organization, the dataspaces that are supported by the dataspace agent 504 may relate to different types of financial data, such as an equities-related dataspace, a consumer loans-related dataspace, a commercial loans-related dataspace, or a client-related dataspace. For a healthcare-related organization, the dataspaces that are supported by the dataspace agent 504 may relate to different types of healthcare-related data, such as a patient-related dataspace, a doctor-related dataspace, or an insurance-related dataspace.

Figure 6:
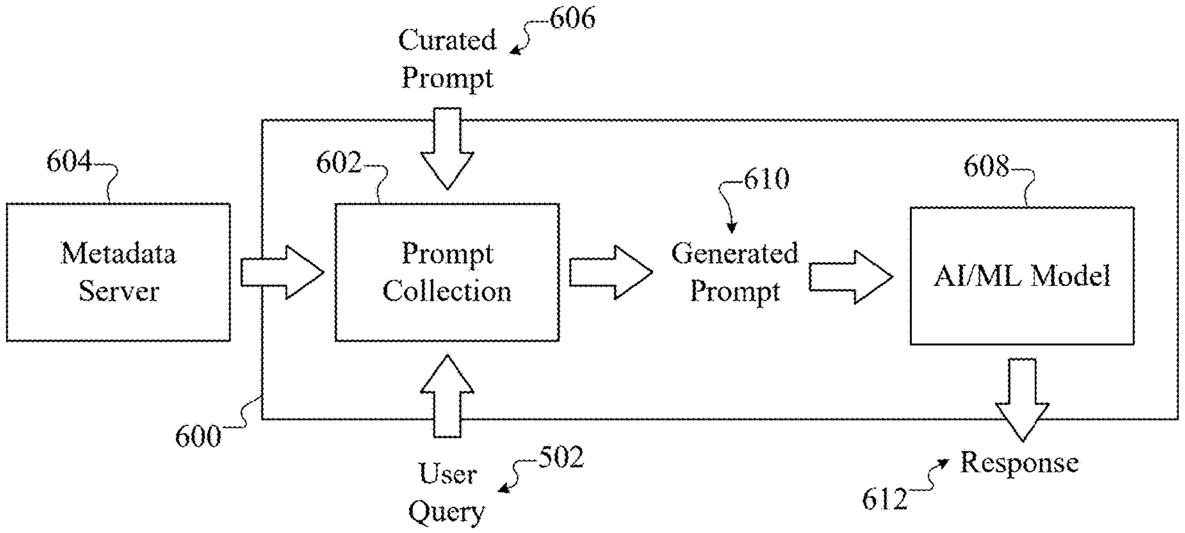
FIG. 6 illustrates an example agent for use in the self-healing generative AI/ML pipeline of FIG. 5 in accordance with one embodiment of this disclosure.

The dataspace agent 504 can use any suitable technique(s) to identify a specific dataspace based on the user query 502. FIG. 6 illustrates an example agent 600 for use in the self-healing generative AI/ML pipeline 410 of FIG. 5 in accordance with one embodiment of this disclosure. Note that while the agent 600 is described here in relation to the dataspace agent 504, the same type of agent 600 may be used as a class agent 506, a property agent 508, a query agent 510, or a self-healing agent 512 as described in more detail below.

As shown in FIG. 6, the dataspace agent 504 may be implemented using a prompt collection function 602. The prompt collection function 602 can receive the user query 502, information from a metadata server 604, and a curated prompt 606. The information from the metadata server 604 may include information related to possible dataspaces that can be selected based on the user query 502. For example, the information from the metadata server 604 may include a name or other identification and a description of each available dataspace. The metadata server 604 can provide metadata from a semantic data model 413 stored in the metadata server 604.

The curated prompt 606 represents a predefined prompt for a large language model or other AI/ML model 608. The curated prompt 606 defines the task to be performed by the AI/ML model 608, which in this case includes identifying an appropriate dataspace based on the user query 502. For example, the prompt collection function 602 can combine the curated prompt 606, the metadata, and the user query 502 and produce a generated prompt 610, which can be provided to the AI/ML model 608. In some cases, for instance, the curated prompt 606 may include one or more examples showing correct results to be generated by the AI/ML model 608. Each example could include an example user query, example dataspace names/identifiers and descriptions, and an example output to be generated by the AI/ML model 608 (such as an output identifying a correct dataspace). The generated prompt 610 can cause the AI/ML model 608 to generate a response 612 that identifies a specific one of the available dataspaces as being associated with the user query 502. Among other things, the AI/ML model 608 here can be used to identify the specific dataspace (from among the set of possible dataspaces) that is most closely aligned semantically with the user query 502.

As one example of this, assume the user query 502 requests something like "Retrieve the historical price for ABC option prices." Here, the expected output of the dataspace agent 504 may be "XZYEquityDataspace," which represents an equities-related dataspace associated with a provider (generically named XYZ) that can provide historical option prices for an equity (generically named ABC). The dataspace agent 504 can include the user query 502 in the generated prompt 610 along with a list of possible dataspace names/identifiers and descriptions obtained from the metadata server 604. The generated prompt 610 may include the curated prompt 606, which could define a role for the agent 600 and set expectations on the output format from the AI/ML model 608, such as by sharing one or more examples. Each example could, for instance, include an example role, an example user query, example dataspace names/identifiers and descriptions, and an example output to be generated by the AI/ML model 608.

The results that can be achieved here can be very accurate. Among other reasons, the AI/ML model 608 may often be trained based on the same concepts that form the basis for the possible dataspace names/identifiers and descriptions. For example, an AI/ML model 608 used in the financial industry will often be contextually trained and aware of financial-related terms, and an AI/ML model 608 used in the healthcare industry will often be contextually trained and aware of healthcare-related terms. Since the possible dataspaces can often be defined (such as based on their names/identifiers and descriptions) using the same types of terms, the AI/ML model 608 can be highly effective at semantically matching user queries 502 and related dataspaces.

Each dataspace that can be selected by the dataspace agent 504 may be associated with a number of classes, possibly a very large number of classes, and each class is related to the concept(s) of the corresponding dataspace. For example, each class may be used to define a relational table or other storage for storing data related to the corresponding dataspace. As particular examples, the classes defined for a finance-related dataspace are typically used to define finance-related data, such as equities-related data, consumer loans-related data, commercial loans-related data, or client-related data. The classes defined for a healthcare-related dataspace are typically used to define healthcare-related data, such as patient-related data, doctor-related data, or insurance-related data. The dataspace agent 504 here can select a specific dataspace associated with the user query 502, which in some cases might actually limit the retrieved data 408 to a subset of available data sources (such as when one or some but not all data sources contain data 408 related to the selected dataspace). The selected dataspace can be associated with one or more classes.

The class agent 506 in FIG. 5 generally operates to select one or more of the classes associated with the dataspace that is selected by the dataspace agent 504. A class generally represents a concept defined by one or more properties that are mapped to one or more relational tables or other data structures or other data. The at least one selected class is mapped to a data topology storing data to be used when generating a response to the user query 502, such as when the at least one selected class is mapped to one or more relational tables. In some cases, the multiple classes may be defined in a semantic data model 413 describing data, such as a semantic data model 413 describing data 408 generated using the data model editor 412. The classes from which at least one class may be selected can vary widely based on, among other things, the specific organization for which the generative AI/ML pipeline 410 is being used and the specific data that is being modeled. In some cases, the class agent 506 can be responsible for selecting one or more classes from among all of the classes that are associated with the selected dataspace. As particular examples, the class agent 506 may filter classes from among a larger set of classes to identify any class(es) relevant to the user query 502, and/or the class agent 506 may join classes from multiple levels of classes to identify classes relevant to the user query 502.

The class agent 506 can use any suitable technique(s) to select at least one specific class from a selected dataspace. In some cases, the class agent 506 may have the same or similar form as the agent 600 shown in FIG. 6. Here, the prompt collection function 602 of the class agent 506 may receive the user query 502, information from the metadata server 604, and another curated prompt 606. The information from the metadata server 604 may include information related to possible classes that can be selected based on the user query 502. For example, the information from the metadata server 604 may include an identification of all classes associated with the selected dataspace from the dataspace agent 504, along with any documentation or other information describing those classes. The prompt collection function 602 can use these inputs to produce a generated prompt 610, which can be provided to an AI/ML model 608 (which may or may not be the same AI/ML model 608 used by the dataspace agent 504). The AI/ML model 608 can generate a response 612 that identifies the class or classes in the selected dataspace that appear most relevant to the user query 502.

The curated prompt 606 represents a predefined prompt for the AI/ML model 608 and defines the task to be performed by the AI/ML model 608, which in this case includes identifying one or more appropriate classes based on the user query 502. For example, the prompt collection function 602 can combine the curated prompt 606, the metadata, and the user query 502 and produce the generated prompt 610, which can be provided to the AI/ML model 608. In some cases, for instance, the curated prompt 606 may include one or more examples showing correct results to be generated by the AI/ML model 608. Each example could include an example user query, example classes and descriptions, and an example output to be generated by the AI/ML model 608 (such as an output identifying one or more correct classes). The generated prompt 610 can cause the AI/ML model 608 to generate a response 612 that identifies one or more classes as being associated with the user query 502.

As noted above, classes can also be associated with each other via associations, and it is possible for these classes and associations to create highly-complex graphs or networks of related classes. Moreover, these associations can span multiple depths of classes. For example, the following classes define a "Facility" class that includes a "maturityDateInfo" class as a property, an "Accrual Controls" class, a "Lineage" class, and an enumerated variable called "State."

```
Class <meta::pure::profiles::temporal.businesstemporal> {meta::pure::profiles::doc.doc = 'A
"facility", is a tradeable credit product that is supplied to a borrower, under the terms and
conditions set in the Credit Agreement. A Credit Agreement can have multiple facilities, and
each facility can have multiple contracts (loans), as long as the total of all funding is within
the facility commitment. A Facility is uniquely identified by Facility ID (also known as
Prime ID) OR by synonyms class which has GSN (Goldman Sachs generated ID).'}
model::domain::referenceData::product::loans::v2::corporate::Facility extends
model::domain::referenceData::product::loans::v2::Loan__v2 { accrualControls:
model::domain::position::holding::loans::v2::AccrualControls[*]; id: lbmFacility__v2__id[1];
maturityDateInfo: lbmFacility__v2__maturityDateInfo[0..1]; name: String[0..1]; state:
model::domain::transactional::issuance::State[0..1]; }
Class model::domain::position::holding::loans::v2::AccrualControls extends
meta::pure::metamodel::type::Any { effectiveDate: StrictDate[1]; facility:
model::domain:referenceData::product::loans::v2::corporate::Facility[1]; }
Class lbmFacility__v2__maturityDateInfo extends meta::pure::metamodel::type::Any {
maturityDate: StrictDate[0..1]; }
Class lbmFacility__v2__id extends model::domain::referenceData::identifier::Lineage {
identifier: String[1]; identifierType:
model::domain::referenceData::identifier::IdentifierType[1]; }
Enum model::domain::transactional::issuance::State { DealInitiated, MemoSubmitted,
CommitteeApproved, Committed, DealClosed, InActive }
```

Figure 7:
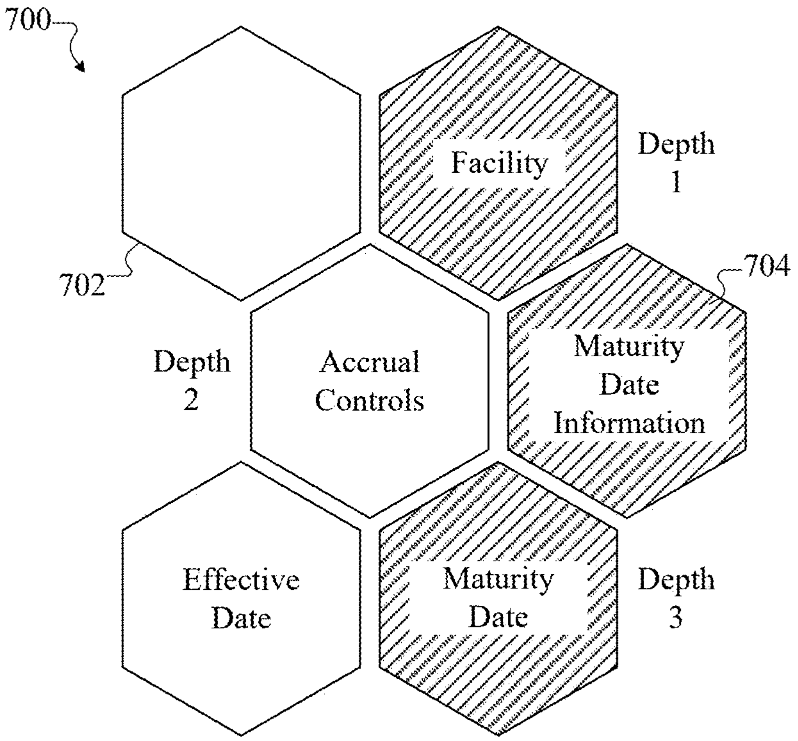
FIG. 7 illustrates an example arrangement of related classes in accordance with one embodiment of this disclosure.

FIG. 7 illustrates an example arrangement 700 of related classes in accordance with one embodiment of this disclosure. This arrangement 700 is based on the classes defined immediately above. Each cell 702 of the arrangement 700 represents a different class, and shading 704 in some of the cells 702 is used to identify associations of the classes represented by those cells. While the arrangement 700 shown in FIG. 7 is relatively simplistic, an arrangement associated with an actual deployed system may be much more complex. The use of the AI/ML model 608 of the class agent 506 to select the class or classes that are relevant to the user query 502 can support class selection even in the presence of such complex arrangements of classes. Again, this is because the AI/ML model 608 of the class agent 506 can be capable of identifying classes that are similar semantically to the user query 502.

Each class that can be selected by the class agent 506 may be associated with a number of properties, possibly a very large number of properties, and each property is related to the concept(s) of the corresponding class. For example, each property may be used to define one column or other portion of a relational table or other storage for storing data related to the corresponding class. As particular examples, the properties defined for a finance-related class are typically used to define specific finance-related data, such as specified data fields related to equities, consumer loans, commercial loans, or clients (like loan identifier, loan amount, etc.). The properties defined for a healthcare-related class are typically used to define specific healthcare-related data, such as specified data fields related to patients, doctors, or insurance. Moreover, each class that can be selected by the class agent 506 may itself be associated with one or more additional classes, and each of those additional classes can have its own property or properties. In addition, the classes and associated class may span one or multiple levels, possibly a very large number of levels.

The property agent 508 in FIG. 5 generally operates to select one or more properties of the class or classes that are selected by the class agent 506 and any associated classes. A property generally represents an atomic value or other entity within a class. The at least one selected property is mapped to the data topology storing the data to be used when generating a response to the user query 502, such as when the at least one selected property is mapped to one or more columns of one or more relational tables. In some cases, the properties may be defined in the semantic data model 413 describing the data, such as the semantic data model 413 describing the data 408 generated using the data model editor 412. The properties from which at least one property may be selected can vary widely based on, among other things, the specific organization for which the generative AI/ML pipeline 410 is being used and the specific data that is being modeled. In some cases, the property agent 508 can be responsible for selecting one or more properties from among all of the properties that are associated with the selected class or classes and any associated classes from the class agent 506. The property agent 508 can also be responsible for selecting one or more properties from among all of the properties that are associated with multiple selected classes across all depths of those classes. As particular examples, the property agent 508 may filter properties from among a larger set of properties to identify any property/properties relevant to the user query 502, and/or the property agent 508 may join properties from multiple levels of classes to identify properties relevant to the user query 502.

The property agent 508 can use any suitable technique(s) to select at least one specific property from one or more selected classes and any associated classes. In some cases, the property agent 508 may have the same or similar form as the agent 600 shown in FIG. 6. Here, the prompt collection function 602 of the property agent 508 may receive the user query 502, information from the metadata server 604, and yet another curated prompt 606. The information from the metadata server 604 may include information related to possible properties that can be selected based on the user query 502. For example, the information from the metadata server 604 may include an identification of all properties associated with the selected class(es) and any associated classes from the class agent 506, along with any documentation or other information describing those properties. The prompt collection function 602 can use these inputs to produce a generated prompt 610, which can be provided to an AI/ML model 608 (which may or may not be the same AI/ML model(s) 608 used by the dataspace agent 504 and the class agent 506). The AI/ML model 608 can generate a response 612 that identifies the property or properties in the selected class(es) and/or any associated class(es) that appear most relevant to the user query 502.

The curated prompt 606 represents a predefined prompt for the AI/ML model 608 and defines the task to be performed by the AI/ML model 608, which in this case includes identifying one or more appropriate properties based on the user query 502. For example, the prompt collection function 602 can combine the curated prompt 606, the metadata, and the user query 502 and produce the generated prompt 610, which can be provided to the AI/ML model 608. In some cases, for instance, the curated prompt 606 may include one or more examples showing correct results to be generated by the AI/ML model 608. Each example could include an example user query, example properties and descriptions, and an example output to be generated by the AI/ML model 608 (such as an output identifying one or more correct properties). The generated prompt 610 can cause the AI/ML model 608 to generate a response 612 that identifies one or more properties as being associated with the user query 502.

In some cases, the interaction between the property agent 508 and its AI/ML model 608 to identify one or more properties related to the user query 502 may take the form of a multi-step conversation between the property agent 508 and the AI/ML model 608. This may be needed or desired in various circumstances, such as when the classes identified by the class agent 506 and any associated classes span multiple levels. For example, the property agent 508 may interact with the AI/ML model 608 to perform a breadth first traversal (BFT) of the selected classes and any associated classes in order to identify initial relevant properties, and the property agent 508 may subsequently interact with the AI/ML model 608 to perform a depth first traversal (DFT) of the classes containing the initial relevant properties to identify a final list of one or more relevant properties.

As a particular example of this, the property agent 508 may expand/explode the properties of the selected class(es) and any associated classes until a specified depth is reached (such as a level of two) during the breadth first traversal, and a generated prompt 610 can be sent to the AI/ML model 608 asking the AI/ML model 608 to identify relevant properties. If the AI/ML model 608 chooses a complex property at a depth greater than the specified depth (such as a depth greater than two), this may involve a property whose class definition needs to be fetched to reach its primitive property. In that case, the class definition of the complex property can be appended to a subsequent generated prompt 610 during the depth first traversal. This can continue until at least one relevant primitive property is found. For instance, using the example classes defined above, a user query 502 related to a maturity date of a facility can start at the Facility class, which can represent the class that is selected by the class agent 506 based on the user query 502. The property agent 508 can cause its AI/ML model 608 to search through and fetch the StrictDate primitive property (sitting at depth three) and defined as Facility.maturityDateInfo.maturityDate.

In some embodiments, the operations of the property agent 508 (shown as prompts) and its AI/ML model 608 (shown as answers) may be summarized using the following flow of interactions.

---

Prompt 1: Given [selected class], its associated classes, and their properties until -continued

```
depth [X], choose a property relevant to [user query]
Answer 1: Chosen primitive and complex properties
Prompt 2: For each complex property identified in Answer 1 and its respective class
   definition, pick a property relevant to [user query]
Answer 2: Updated chosen primitive and complex properties
...
Prompt n: For each complex property identified in Answer [n−1] and its respective
   class definition, pick a property relevant to [user query]
Answer n: All primitive properties relevant to [user query]
```

The query agent 510 in FIG. 5 generally operates to take the one or more classes or associated classes selected by the class agent 506 and the one or more properties selected by the property agent 508 and generate an initial data access query 514. For example, the query agent 510 may generate an initial data access query 514 that is designed to retrieve data 408 using the selected class/classes and the selected property/properties. The initial data access query 514 here represents an initial attempt (but possibly not a final attempt) at generating a suitable data access query that might be used to obtain data 408 in order to generate a response to the user query 502. The reason for the uncertainty here is that the initial data access query 514 may be successful or may fail due to issues like syntax errors, other errors, or hallucinations.

The query agent 510 can use any suitable technique(s) to generate initial data access queries based on selected classes/associated classes and selected properties. In some cases, the query agent 510 may have the same or similar form as the agent 600 shown in FIG. 6. Here, the prompt collection function 602 of the query agent 510 may receive the user query 502, information from the metadata server 604, and still another curated prompt 606. The information from the metadata server 604 may include information related to the syntax to be used when generating one or more database queries or other data access queries. For example, the information from the metadata server 604 may include a primer or other information providing guidance on the syntax to be used to generate the data access queries. The prompt collection function 602 can use these inputs to produce a generated prompt 610, which can be provided to an AI/ML model 608 (which may or may not be the same AI/ML model(s) 608 used by the dataspace agent 504, the class agent 506, and the property agent 508). The AI/ML model 608 can generate a response 612 that includes the initial data access query 514.

The curated prompt 606 represents a predefined prompt for the AI/ML model 608 and defines the task to be performed by the AI/ML model 608, which in this case includes generating a data access query based on the user query 502. For example, the prompt collection function 602 can combine the curated prompt 606, the metadata, and the user query 502 and produce the generated prompt 610, which can be provided to the AI/ML model 608. In some cases, for instance, the curated prompt 606 may include one or more examples showing correct results to be generated by the AI/ML model 608. Each example could include an example user query, an example prompt associated with the user query, and an example output to be generated by the AI/ML model 608 (such as an output identifying a correct data access query based on the example prompt). The generated prompt 610 can cause the AI/ML model 608 to generate a response 612 that includes the initial data access query 514.

Ideally, the initial data access query 514 would be correct in all circumstances, and the initial data access query 514 could be used (such as by the modeled data querying function 414 or query engine 428) to obtain data 408 used to produce a response to the user query 502 that is provided to a user. In some cases, that may be true, and the response to the user query 502 can include or be based on the data 408 that is retrieved using the initial data access query 514. However, there are a number of reasons why the initial data access query 514 may be incorrect or incomplete. For example, the syntax of the initial data access query 514 may be incorrect, resulting in a complete or partial failure to retrieve desired data 408 for use in generating the response to the user query 502. As another example, one or more AI/ML models 608 of the agents 504-510 may suffer from a hallucination and generate a response 612 that contains imaginary information or information that is otherwise false or incorrect, such as when the AI/ML model 608 of the class agent 506 hallucinates the existence of a class or the AI/ML model 608 of the property agent 508 hallucinates the existence of a property. In other words, the initial data access query 514 may be incorrect due to things like hallucinations or errors by the AI/ML pipeline 410.

The self-healing agent 512 can be used as part of a potentially-iterative process to reduce or resolve hallucinations or errors involving the AI/ML pipeline 410. For example, the self-healing agent 512 can receive the initial data access query 514 and determine if the initial data access query 514 includes a hallucination or error. In some cases, this can be done using the compiler 426, such as when the compiler 426 determines if there is a syntax error in the initial data access query 514. The compiler 426 can be designed here to identify any number of compilation or build errors. Based on the identifier error or hallucination, the self-healing agent 512 can prompt its own AI/ML model 608 or cause the query agent 510 to re-prompt its AI/ML model 608 in order to generate an updated data access query 514. The self-healing agent 512 can again determine whether there is an error or hallucination (such as by using information from the compiler 426) in the updated data access query 514. If so, the self-healing agent 512 can cause another updated data access query 514 to be generated. This can occur any number of times during an iterative process. Ideally, at the end of the process, a final (valid) data access query 514 is generated by the AI/ML pipeline 410.

In some embodiments, the self-healing agent 512 can use various prescription plans in order to facilitate the generation of the updated data access queries 514. For example, in some cases, the information from the metadata server 604 provided to the prompt collection function 602 of the self-healing agent 512 may include prescription plans associated with resolving problems experienced by the AI/ML pipeline 410. Each prescription plan can include information identifying a course of action to be taken in response to a particular type of problem (error or hallucination) that is experienced or can include information that can be provided to one or more AI/ML models 608 in order to avoid that problem.

As one example, in some cases, if an AI/ML model 608 generates a hallucination, a prescription plan may identify additional information to be included in an updated prompt 610 or identify how the updated prompt 610 can be reformatted or rephrased so that the AI/ML model 608 can avoid the hallucination. As a particular example, the prescription plan may include or identify additional information to be included in an updated prompt 610, where the additional information provides additional context for the AI/ML model 608. This additional context may help the AI/ML model 608 to generate an updated response 612 that avoids the same or similar type of hallucination.

As another example, if a data access query 514 contains an incorrect syntax, a prescription plan may include a defined correction or a defined set of interactions that may occur with an AI/ML model 608 in order to identify a correction that fixes the syntax of the data access query 514. For instance, assume the AI/ML pipeline 410 or one of its AI/ML models 608 outputs that an enumerated variable has a value of "Active," but assume that the enumerated variable in a database may have a value selected from the set {DealInitiated, MemoSubmitted, CommitteeApproved, Committed, DealClosed, InActive}. In this example, the compiler 426 may generate an error, such as "Enum value does not exist." A prescription plan associated with the "Enum value does not exist" error may cause the self-healing agent 512 to ask an AI/ML model 608 to identify all possible values of the enumerated variable. From the resulting response, the self-healing agent 512 can select the value for the enumerated variable that most closely matches the prior output of the AI/ML model 608 (in this case by selecting "InActive" since it is closest to "Active"). The self-healing agent 512 or the query agent 510 may generate an updated prompt 610 that includes or identifies the correct value of the enumerated variable.

There may be any number of prescription plans that are available for use by the self-healing agent 512. For example, there may be any number of potential types of syntax errors in the data access queries 514 generated by the AI/ML pipeline 410, and there may be at least one associated prescription plan associated with each type of syntax error. Also or alternatively, the self-healing agent 512 may obtain a correct syntax from the query engine 428 or obtain incorrect syntax error information from the compiler 426 for a particular data access query 514, and the self-healing agent 512 or the query agent 510 may include this information in an updated prompt 610. The additional information in the updated prompt 610 may cause the associated AI/ML model 608 to produce an updated data access query 514 with the correct syntax (or that at least removes the previous syntax error). The syntax checks can be performed for each data access query 514 generated during this process.

As another example, a compiler 426 can perform a check of real attributes in a semantic data model 413 with attributes present in each data access query 514 generated by the AI/ML pipeline 410. If there is a mismatch, it may mean that an attribute was hallucinated (imagined), that an attribute value was hallucinated, or that a data type of an attribute was incorrect. Again, at least one associated prescription plan may define how the self-healing agent 512 can go about correcting these errors or hallucinations.

The query engine 428 may also generate information in response to invalid or other erroneous data access queries 514. For example, assume that a data access query 514 from the AI/ML pipeline 410 has proper syntax. However, when the query engine 428 attempts to execute the data access query 514, there may be a build error like "Cannot fetch Complex data type attribute directly" (which basically means that the data access query is incomplete). At least one associated prescription plan may define how the self-healing agent 512 can go about using the semantic data model 413 to make the data access query 514 complete, which may or may not involve sending one or more additional prompts 610 to one or more of the AI/ML models 608.

As another example, assume that a data access query 514 from the AI/ML pipeline 410 has proper syntax. However, when the query engine 428 attempts to execute the data access query 514, there may be a data access error, such as when a user who submitted the user query 502 does not have permission to access the required data 408. In that case, at least one associated prescription plan may indicate that the self-healing agent 512 should not be used, and the user may be informed that he or she needs to obtain raised access in order to fetch the needed data or that he or she is simply not authorized to access the needed data.

The examples above are generally associated with errors in the properties and generated data access queries 514 themselves. Other errors may exist with respect to incorrect dataspace or class identifications. For example, the identification of an incorrect dataspace may prevent the AI/ML pipeline 410 from obtaining data needed to answer the user query 502, since the data needed to answer the user query 502 may be stored in at least one data source not associated with the incorrect dataspace. At least one associated prescription plan may indicate that the self-healing agent 512 should rerun the dataspace agent 504 with additional information included in its prompt 610, which could help its AI/ML model 608 identify a different dataspace. If an AI/ML model 608 hallucinates a new dataspace or class in that dataspace which does not actually exist, at least one associated prescription plan may indicate that the self-healing agent 512 should rerun the class agent 506 with additional information included in the prompt 610, which could help its associated AI/ML model 608 identify one or more different classes. In either case, the self-healing agent 512 may provide information from the semantic data model 413 to the AI/ML model(s) 608 in order to identify a correct dataspace or class(es).

In general, the specific prescription plans that are defined and made available for use can vary widely based on the specific types of hallucinations or errors that might be experienced in any given deployment and based on how those specific types of hallucinations or errors can be remedied. Also, as shown above, not all prescription plans may require the re-prompting of an AI/ML model 608. For instance, some prescription plans may identify functions to be performed by the query engine 428, and/or some prescription plans may request user action.

Figure 8:
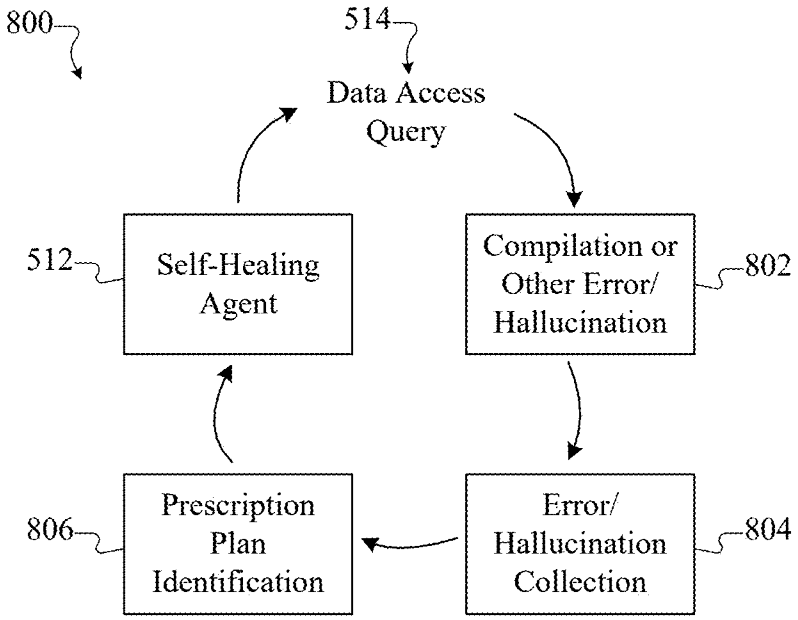
FIG. 8 illustrates an example iterative process that may be used with a self-healing generative AI/ML pipeline in accordance with one embodiment of this disclosure.

FIG. 8 illustrates an example iterative process 800 that may be used with the self-healing agent 512 in accordance with one embodiment of this disclosure. As shown in FIG. 8, a data access query 514 can be associated with a compilation or other error or a hallucination 802, such as when the data access query 514 has a syntax or other error or a hallucinated class or property. As noted above, in some cases, certain errors may be identified by the compiler 426, while other errors may be identified by the query engine 428. However, hallucinations or errors may be identified in any other suitable manner. In general, this disclosure is not limited to any particular technique(s) for identifying hallucinations or errors made by AI/ML models.

Any hallucinations or errors are collected by an error/hallucination collection function 804, which may be used to identify whether the compiler 426, query engine 428, and/or other logic of the AI/ML framework 400 or AI/ML pipeline 410 identified any hallucinations or errors. A prescription plan identification function 806 can use any identified hallucinations or errors to select a prescription plan or prescription plans that are suited for resolving the hallucination(s) or error(s). For example, the prescription plan identification function 806 may select a prescription plan associated with a syntax error, a prescription plan associated with identification of an incorrect or non-existent class or property, a prescription plan associated with identification of incorrect or improper values, or a prescription plan associated with incorrect data types. The specific prescription plan(s) selected here can depend, among other things, on the type(s) of hallucination(s) or error(s) identified. The selected prescription plan(s) can be provided to the self-healing agent 512 for use in generating an updated data access query 514. For instance, the self-healing agent 512 may create (or cause the query agent 510 to create) a new prompt 610 used by an AI/ML model 608 to generate the updated data access query 514, or the self-healing agent 512 may add (or cause the query agent 510 to add) new information to a prior prompt 610 in order to generate the updated data access query 514.

This supports an iterative approach in which the self-healing agent 512 identifies suitable fixes automatically, ideally until the AI/ML pipeline 410 produces a suitable data access query 514. This can be repeated any number of times until a final data access query 514 having no hallucination or error is generated by the AI/ML pipeline 410, at which point the final data access query 514 can be used by the query engine 428 to retrieve data. The retrieved data can be provided as or used to generate a response to the user query 502.

In this way, the agents 504-512 in the AI/ML pipeline 410 can be used to identify a semantically-aligned subset of data 408 from a larger (and potentially much larger) data topology based on a user query 502. The AI/ML pipeline 410 identifies a dataspace that is semantically aligned with the user query 502, and the AI/ML pipeline 410 identifies one or more classes and one or more properties within that dataspace that are again semantically aligned with the user query 502. This is because the data topology of the data 408 being used can be modeled using a semantic data model 413 that identifies the classes and associated properties (and optionally class associations), and those classes, properties, and optional associations are semantically aligned with the natural language on which the AI/ML pipeline 410 was trained. For instance, the dataspaces, classes, properties, and optional associations modeled by the semantic data model 413 can be described using the same natural language terms as the natural language on which the AI/ML pipeline 410 was trained. The query agent 510 generates data access queries based on the identified classes and properties, and the self-healing agent 512 is used to resolve problems associated with the data access queries until suitable (executable) data access queries are obtained. Among other things, this approach supports a multi-turn conversation with the AI/ML pipeline 410, which can be performed using the self-healing agent 512 until a suitable data access query 514 is generated.

Among other things, the AI/ML pipeline 410 can be used to produce more accurate results when responding to user queries 502. This is because the entire AI/ML pipeline 410 can use the semantic data model(s) 412 to generate data access queries 514 for retrieving data in response to user queries 502 with much higher accuracy compared to direct SQL queries generated from user queries with no semantic data models defining the relevant data topology. The improved accuracy here can be obtained since the semantic data model(s) 413 can provide useful contextual information for the AI/ML pipeline 410 when generating the data access queries 514. As a result, the AI/ML pipeline 410 can be used to retrieve data used to answer user queries 502 that might have otherwise not been answered by generating direct SQL queries from user queries in natural language. Also, the AI/ML pipeline 410 can be used to select tables and columns and perform filter and join operations more accurately compared to direct SQL queries from user queries in natural language. In addition, the data that is actually retrieved by the generated data access queries 514 can be much more semantically-accurate compared to direct SQL queries from user queries in natural language.

Although FIGS. 5 through 8 illustrate one example of a generative AI/ML pipeline 410 supporting self-healing and related details, various changes may be made to FIGS. 5 through 8. For example, while FIGS. 5 through 8 may be described as involving the use of a large language model as an AI/ML model 608, FIGS. 5 through 8 may be used with any suitable AI/ML models. Also, as noted above, the agents 504-512 in the AI/ML pipeline 410 may use the same AI/ML model 608, or different ones of the agents 504-512 in the AI/ML pipeline 410 may use different AI/ML models 608.

Figure 9:
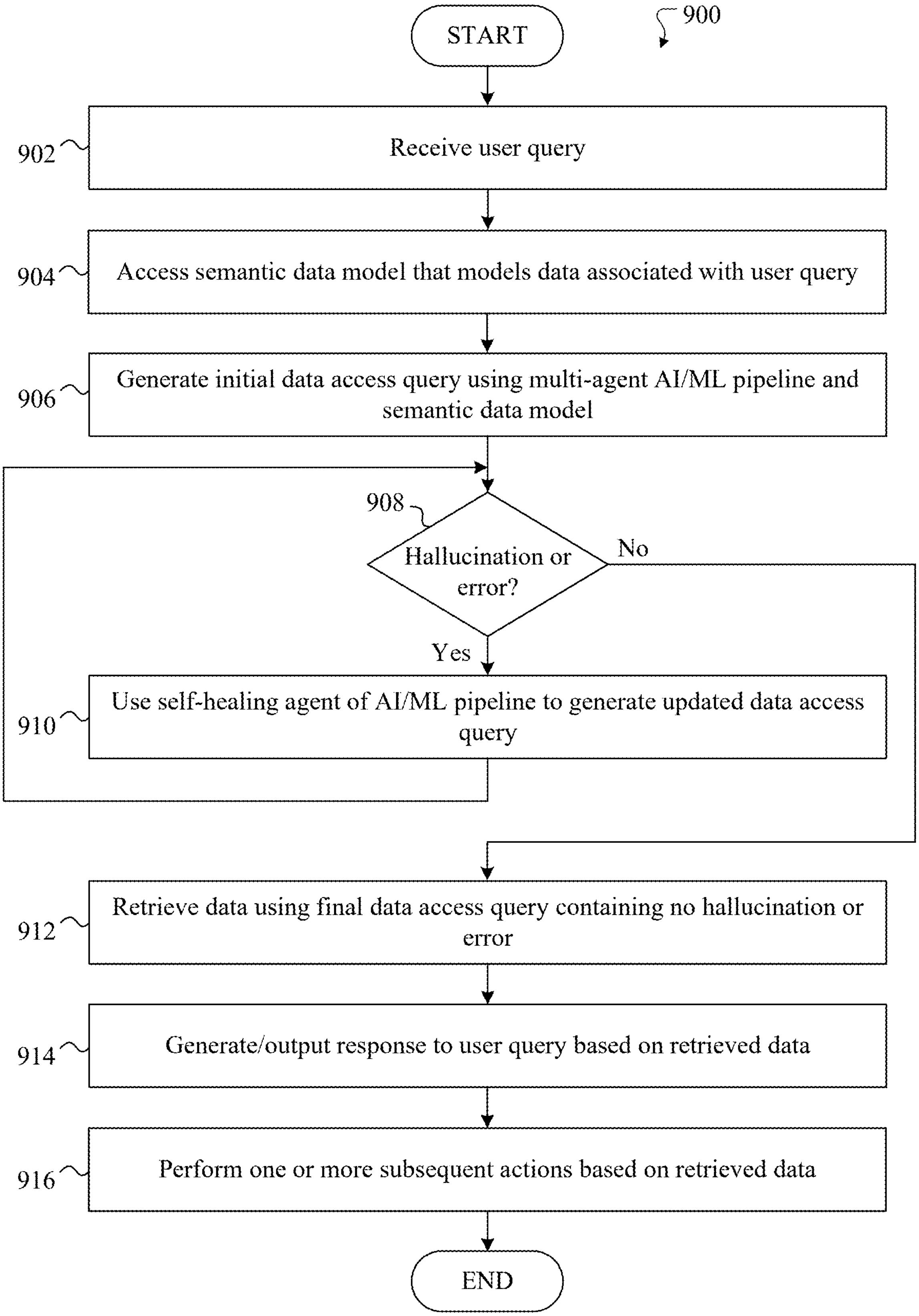
FIG. 9 illustrates an example method for using a self-healing generative AI/ML pipeline in accordance with one embodiment of this disclosure.

FIG. 9 illustrates an example method 900 for using a self-healing generative AI/ML pipeline in accordance with one embodiment of this disclosure. For case of explanation, the method 900 is described as being performed using the AI/ML framework 400 shown in FIG. 4 with the generative AI/ML pipeline 410 as shown in FIG. 5, which can be implemented using the server 102 shown in FIG. 1 (which itself can be implemented using one or more instances of the computer system 200 shown in FIG. 2). However, the method 900 may be performed using any suitable device(s), framework(s), and pipeline(s) and in any suitable system(s).

As shown in FIG. 9, a user query is received at step 902. This may include, for example, the processor 202 of the server 102 providing a user query 502 to the AI/ML pipeline 410. A semantic data model is accessed at step 904. This may include, for example, the processor 202 of the server 102 accessing a metadata server 604 or other storage that contains a semantic data model 413. The semantic data model 413 can model or otherwise represent data associated with the user query 502.

An initial data access query is generated using the AI/ML pipeline and the semantic data model at step 906. This may include, for example, the processor 202 of the server 102 using the generative AI/ML pipeline 410 to select a dataspace associated with the user query 502, select one or more classes within the selected dataspace, select one or more properties of the selected class(es) or any related class(es), and generate an initial data access query 514. One or more of the agents in the AI/ML pipeline 410 can operate or be guided using metadata from the semantic data model 413.

A determination is made whether there is a hallucination or error affecting the initial data access query at step 908. This may include, for example, the processor 202 of the server 102 using output from a compiler 426, query engine 428, or other logic to determine whether there may be a hallucination or error affecting the initial data access query 514. If so, a self-healing agent of the AI/ML pipeline is used to generate an updated data access query at step 910. This may include, for example, the processor 202 of the server

102 obtaining a prescription plan from the metadata server 604 or other source(s), where the prescription plan can be selected based on the hallucination or error detected. The prescription plan can indicate how the self-healing agent 512 may go about generating (or causing the query agent 510 to generate) an updated data access query 514. The process can return to step 908 to determine whether there is a hallucination or error affecting the updated data access query 514.

The final data access query (either the initial data access query or a last updated data access query) that is free from hallucination or error can be used to retrieve data for the user query at step 912. This may include, for example, the processor 202 of the server 102 using the query engine 428 to retrieve data 408 based on the final data access query 514. In some cases, the user who provided the user query 502 may be asked to review and potentially approve the final data access query 514 prior to execution. A response to the user query can be generated and output at step 914. This may include, for example, the processor 202 of the server 102 generating a natural language output or other output that includes the retrieved data 408. One or more subsequent actions may also be performed at step 916. For instance, the processor 202 of the server 102 may engage in a chat session with a user who provided the user query 502, or one or more tasks can be performed based on the retrieved data 408. The processor 202 of the server 102 may receive a request to export the retrieved data 408, and the processor 202 of the server 102 can format and export the data. In general, this disclosure is not limited to any specific use of retrieved data.

Although FIG. 9 illustrates one example of a method 900 for using a self-healing generative AI/ML pipeline, various changes may be made to FIG. 9. For example, while shown as a series of steps, various steps in FIG. 9 may overlap, occur in parallel, occur in a different order, or occur any number of times (including zero times).

Some portions of the above description describe embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs including instructions for execution by at least one processor or equivalent electrical circuits, microcode, or the like. Furthermore, it may be convenient at times to refer to these arrangements of functional operations as modules without loss of generality.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc, a DVD, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. Where values are described as "approximate" or "substantially" (or their derivatives), such values should be construed as accurate ±10% unless another meaning is apparent from the context. From example, "approximately ten" should be understood to mean "in a range from nine to eleven."

Any reference to "one embodiment," "an embodiment," "some embodiments," and the like means that a particular element, feature, structure, or characteristic described in connection with the embodiment(s) is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

The terms "comprises," "comprising," "includes," "including," "has," "having," or any other variation thereof are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed. The scope of protection should be limited only by any claims that ultimately issue.

What is claimed is:

1. A method comprising:

providing a user query to a self-healing multi-agent artificial intelligence/machine learning (AI/ML) pipeline, the user query requesting a response based on data stored in a data topology, the data topology modeled using a semantic data model;

generating an initial data access query for retrieving the data from the data topology using the AI/ML pipeline and the semantic data model;

determining that the initial data access query includes a hallucination or error;

performing an automatic loop one or more times, wherein the automatic loop includes:

generating an updated data access query for retrieving the data from the data topology using the AI/ML pipeline and the semantic data model;

determining whether the updated data access query includes a hallucination or error; and if the updated data access query includes a hallucination or error, repeating the automatic loop; and using a final data access query with no hallucination or error, as generated by the automatic loop, to retrieve the data from the data topology in order to generate the response;

wherein:

the self-healing multi-agent AI/ML pipeline comprises a dataspace agent, a class agent, a property agent, a query agent, and a self-healing agent;

the dataspace agent selects one of multiple dataspaces associated with the user query;

the class agent selects at least one of multiple classes associated with the selected dataspace, the at least one selected class mapped to the data topology;

the property agent selects at least one of multiple properties within the at least one selected class; and the query agent generates each data access query based on at least one of: the at least one selected class and the at least one selected property.

2. The method of claim 1, wherein:

the semantic data model provides context to the dataspace, class, property, and query agents of the AI/ML pipeline; and the dataspace, class, property, and query agents comprise one or more AI/ML models that generate responses when prompted by the dataspace, class, property, and query agents.

3. The method of claim 1, wherein:

the data topology includes tabular data; and the semantic data model allows the AI/ML pipeline to understand columns of data in the tabular data.

4. The method of claim 1, wherein the semantic data model models the data topology using the multiple classes and the multiple properties that are semantically aligned with natural language on which the AI/ML pipeline is trained.

5. The method of claim 4, wherein at least some of the multiple classes are associated with multiple associations in the semantic data model.

6. The method of claim 1, wherein the self-healing agent determines, for each data access query, whether:

a syntax of the data access query has one or more errors;

at least one property in the data access query exists;

one or more values in the data access query are proper; and a data type of a value in the data access query matches an expected data type.

7. The method of claim 1, wherein at least one of the data access queries is based on one or more of:

filtering of at least one of classes and properties defined in the semantic data model based on the user query; and joining of at least one of classes and properties defined at multiple levels in the semantic data model based on the user query.

8. The method of claim 1, wherein performing the automatic loop further comprises:

selecting, from among a plurality of prescription plans, a prescription plan associated with the hallucination or error; and generating the updated data access query using the AI/ML pipeline based on the selected prescription plan.

9. The method of claim 1, wherein:

the hallucination or error comprises an incorrect dataspace selected by the dataspace agent or an incorrect class selected by the class agent; and performing the automatic loop comprises rerunning, using additional information provided to the AI/ML pipeline, at least one of:

the dataspace agent to select a different dataspace; or the class agent to select one or more different classes.

10. The method of claim 1, wherein, when the hallucination or error comprises an incorrect enumerated value, generating the updated data access query comprises selecting a value that most closely matches a prior output of the AI/ML pipeline.

11. The method of claim 1, wherein the class agent comprises a prompt collection function configured to:

receive the user query, information from a metadata server, and another curated prompt; and produce a generated prompt that, when provided to an AI/ML model, causes the AI/ML model to respond by identifying at least one of the multiple classes that appears most relevant to the user query.

12. The method of claim 1, wherein the property agent comprises a prompt collection function configured to:

receive the user query, information from a metadata server, and another curated prompt; and produce a generated prompt that, when provided to an AI/ML model, causes the AI/ML model to respond by identifying at least one of the multiple properties that is associated with the user query.

13. The method of claim 1, wherein the query agent comprises a prompt collection function configured to:

receive the user query, information from a metadata server, and another curated prompt; and produce a generated prompt that, when provided to an AI/ML model, causes the AI/ML model to generate a response that includes the data access query.

14. An apparatus comprising:

at least one processing device configured to:

provide a user query to a self-healing multi-agent artificial intelligence/machine learning (AI/ML) pipeline, the user query requesting a response based on data stored in a data topology, the data topology modeled using a semantic data model;

generate an initial data access query for retrieving the data from the data topology using the AI/ML pipeline and the semantic data model;

determine that the initial data access query includes a hallucination or error;

perform an automatic loop one or more times, wherein, to perform the automatic loop, the at least one processing device is configured to:

generate an updated data access query for retrieving the data from the data topology using the AI/ML pipeline and the semantic data model;

determine whether the updated data access query includes a hallucination or error; and if the updated data access query includes a hallucination or error, repeat the automatic loop; and use a final data access query with no hallucination or error, as generated by the automatic loop, to retrieve the data from the data topology in order to generate the response;

wherein:

the self-healing multi-agent AI/ML pipeline comprises a dataspace agent, a class agent, a property agent, a query agent, and a self-healing agent;

the dataspace agent is configured to select one of multiple dataspaces associated with the user query;

the class agent is configured to select at least one of multiple classes associated with the selected dataspace, the at least one selected class mapped to the data topology;

the property agent is configured to select at least one of multiple properties within the at least one selected class; and the query agent is configured to generate each data access query based on at least one of: the at least one selected class and the at least one selected property.

15. The apparatus of claim 14, wherein:

the semantic data model provides context to the dataspace, class, property, and query agents of the AI/ML pipeline; and the dataspace, class, property, and query agents comprise one or more AI/ML models configured to generate responses when prompted by the dataspace, class, property, and query agents.

16. The apparatus of claim 14, wherein the semantic data model models the data topology using the multiple classes and the multiple properties that are semantically aligned with natural language on which the AI/ML pipeline is trained.

17. The apparatus of claim 16, wherein at least some of the multiple classes are associated with multiple associations in the semantic data model.

18. The apparatus of claim 14, wherein the self-healing agent is configured to determine, for each data access query, whether:

a syntax of the data access query has one or more errors;

at least one property in the data access query exists;

one or more values in the data access query are proper; and a data type of a value in the data access query matches an expected data type.

19. A non-transitory computer readable medium containing instructions that when executed cause at least one processor to:

provide a user query to a self-healing multi-agent artificial intelligence/machine learning (AI/ML) pipeline, the user query requesting a response based on data stored in a data topology, the data topology modeled using a semantic data model;

generate an initial data access query for retrieving the data from the data topology using the AI/ML pipeline and the semantic data model;

determine that the initial data access query includes a hallucination or error;

perform an automatic loop one or more times, wherein the instructions when executed cause the at least one processor, during the automatic loop, to:

generate an updated data access query for retrieving the data from the data topology using the AI/ML pipeline and the semantic data model;

determine whether the updated data access query includes a hallucination or error; and if the updated data access query includes a hallucination or error, repeat the automatic loop; and use a final data access query with no hallucination or error, as generated by the automatic loop, to retrieve the data from the data topology in order to generate the response;

wherein:

the self-healing multi-agent AI/ML pipeline comprises a dataspace agent, a class agent, a property agent, a query agent, and a self-healing agent;

the dataspace agent is configured to select one of multiple dataspaces associated with the user query;

the class agent is configured to select at least one of multiple classes associated with the selected dataspace, the at least one selected class mapped to the data topology;

the property agent is configured to select at least one of multiple properties within the at least one selected class; and the query agent is configured to generate each data access query based on at least one of: the at least one selected class and the at least one selected property.

20. The non-transitory computer readable medium of claim 19, wherein:

the semantic data model provides context to the dataspace, class, property, and query agents of the AI/ML pipeline; and the dataspace, class, property, and query agents comprise one or more AI/ML models configured to generate responses when prompted by the dataspace, class, property, and query agents.

* * * * *